(12) United States Patent
Turner et al.

(10) Patent No.: US 8,672,336 B2
(45) Date of Patent: Mar. 18, 2014

(54) AUTOMATIC SCOOTER UNLOCKING MECHANISM

(76) Inventors: Michael Hughesdon Turner, Arlington, VA (US); Ryan Patrick Murphy, Hermosa Beach, CA (US)

( * ) Notice: Subject to any disclaimer, the term of this patent is extended or adjusted under 35 U.S.C. 154(b) by 0 days.

(21) Appl. No.: 13/355,492

(22) Filed: Jan. 21, 2012

(65) Prior Publication Data
US 2012/0187646 A1 Jul. 26, 2012

Related U.S. Application Data

(60) Provisional application No. 61/457,173, filed on Jan. 21, 2011.

(51) Int. Cl.
*B62M 1/00* (2010.01)

(52) U.S. Cl.
USPC ............... 280/87.05; 280/87.01; 280/278; 280/87.041; 280/287

(58) Field of Classification Search
USPC ......... 280/87.05, 87.01, 87.021, 87.041, 278, 280/289
See application file for complete search history.

(56) References Cited

U.S. PATENT DOCUMENTS

| | | | |
|---|---|---|---|
| 6,425,589 B1 | 7/2002 | Wu | |
| 6,604,615 B2 | 8/2003 | Wu | |
| 7,237,660 B2 | 7/2007 | Wu | |
| 7,431,311 B2 | 10/2008 | Turner et al. | |
| 7,584,985 B2 * | 9/2009 | You et al. | 280/643 |
| 7,731,204 B2 | 6/2010 | Turner et al. | |
| 2002/0180169 A1 * | 12/2002 | Kwok | 280/87.041 |
| 2004/0056442 A1 * | 3/2004 | Ostrowski et al. | 280/87.041 |

FOREIGN PATENT DOCUMENTS

| | | | | |
|---|---|---|---|---|
| DE | 10215102 | | 10/2003 | |
| DE | 10215102 A1 * | | 10/2003 | ............ B62K 15/00 |
| EP | 0663332 A2 * | | 7/1995 | ............ B62B 7/06 |
| GB | 176516 | * | 1/1970 | ............ B62B 9/12 |
| GB | 176517 | * | 1/1970 | ............ B62B 7/16 |
| WO | WO 9416928 A1 * | | 8/1994 | ............ B62B 7/10 |

* cited by examiner

*Primary Examiner* — J. Allen Shriver, II
*Assistant Examiner* — Steve Clemmons

(57) ABSTRACT

The automatic scooter unlocking mechanism is an improvement to existing folding kick scooter designs whereby vertical movement of a telescoping handlebar automatically causes rotation, and a corresponding unlocking, of a scooter footboard latch. The inventive mechanism places an extension on to the rotating handle of the footboard latch and places the distal end of the extension in such a location so as to contact a protuberance located on the sliding portion of the telescoping handlebar. During contact, the extension is deflected and the handle of the footboard latch rotates and unlocks, allowing for free rotation of the scooter footboard between folded and unfolded states. The inventive mechanism can be integral to a kick scooter design or can take the form of a system that can be installed on to a pre-existing kick scooter in an aftermarket fashion.

14 Claims, 17 Drawing Sheets

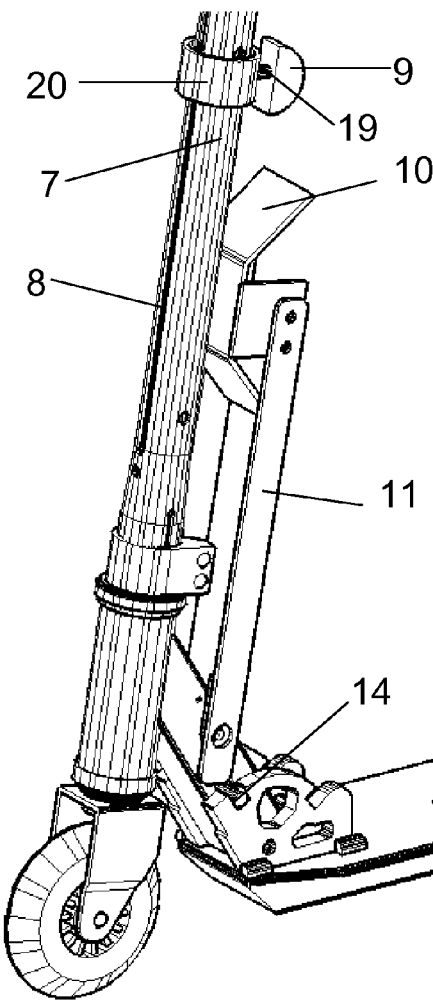
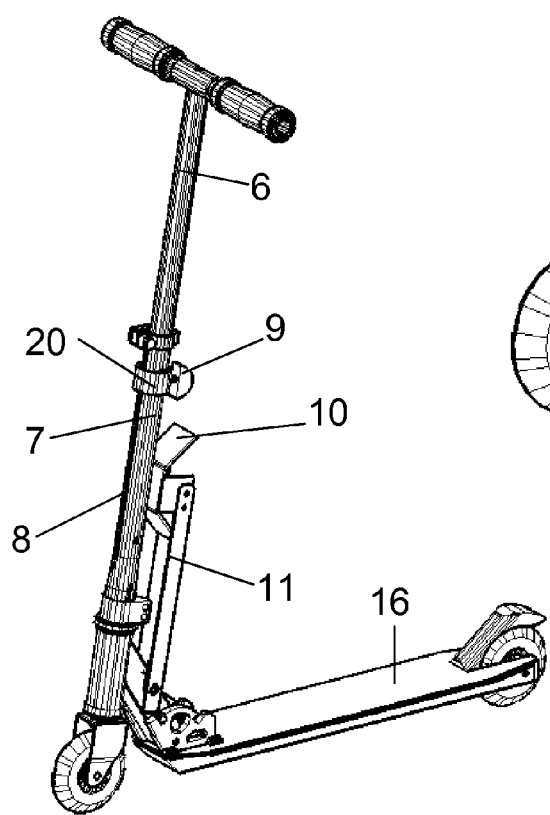

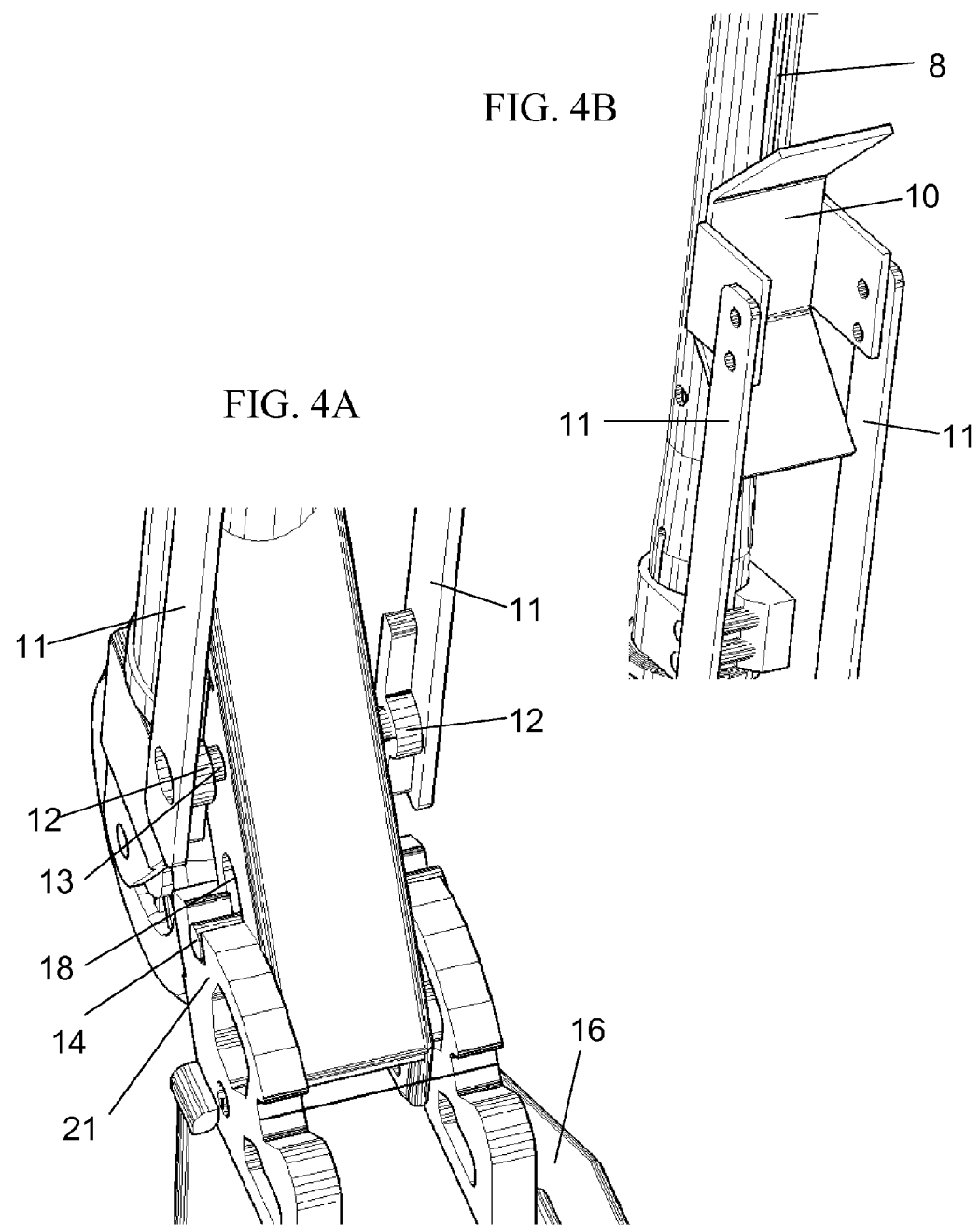

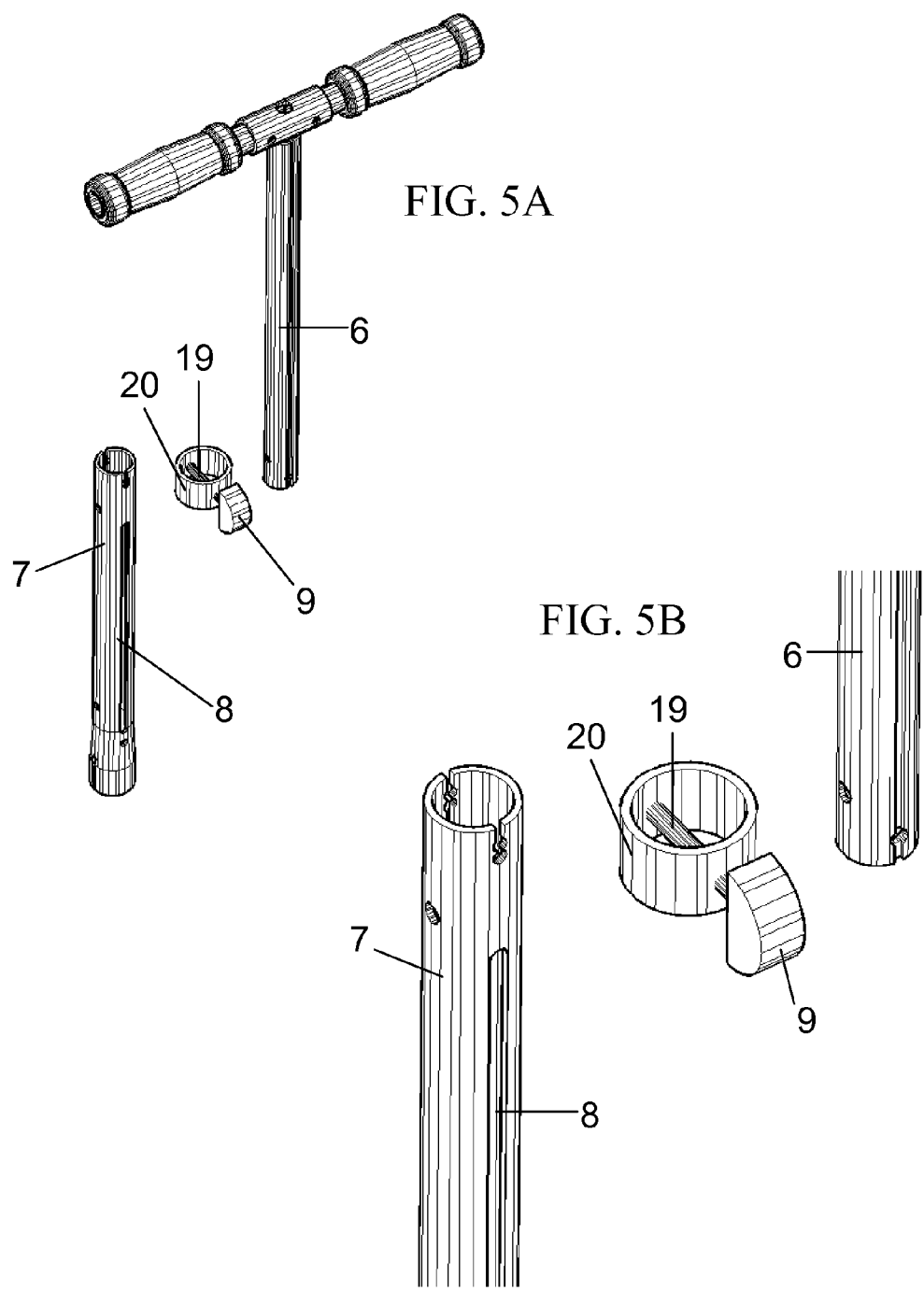

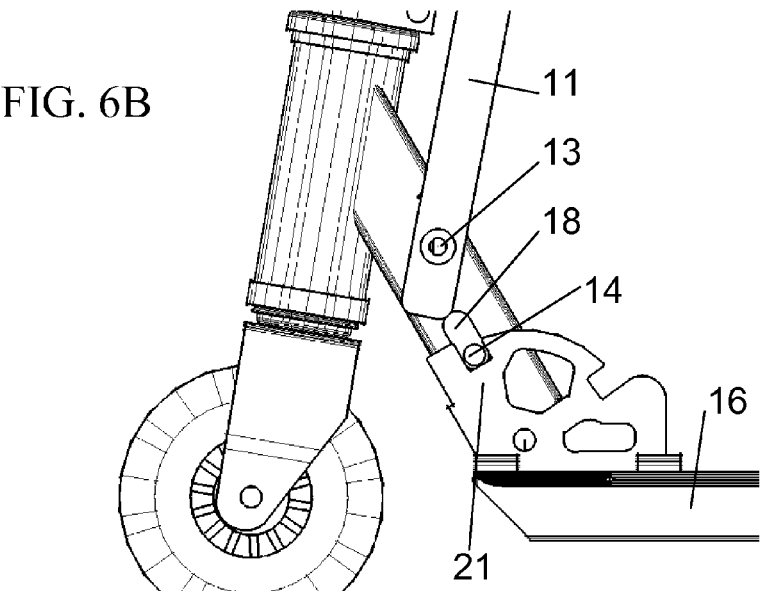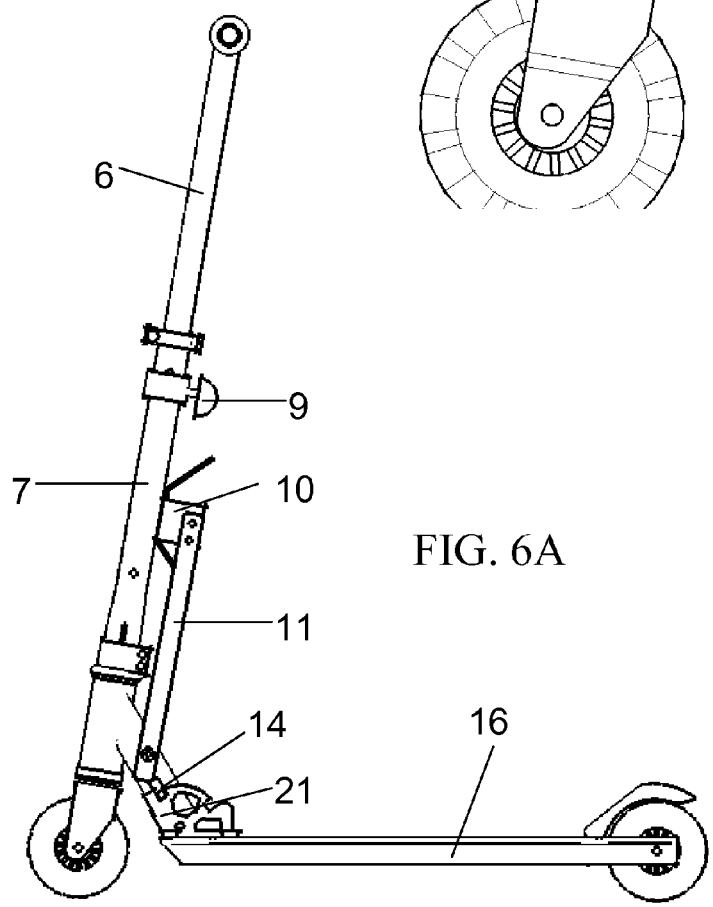

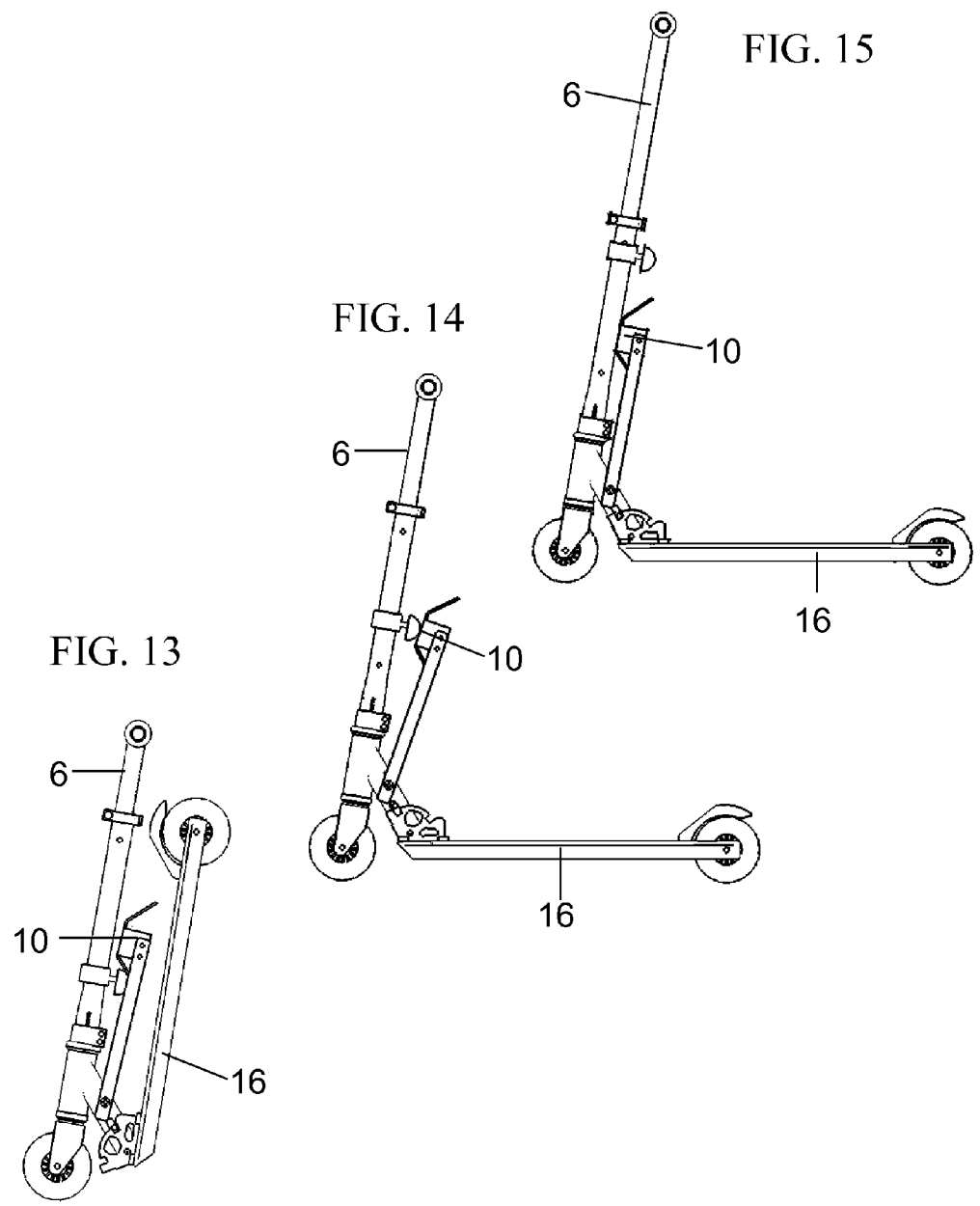

FIG. 16A
FIG. 16B
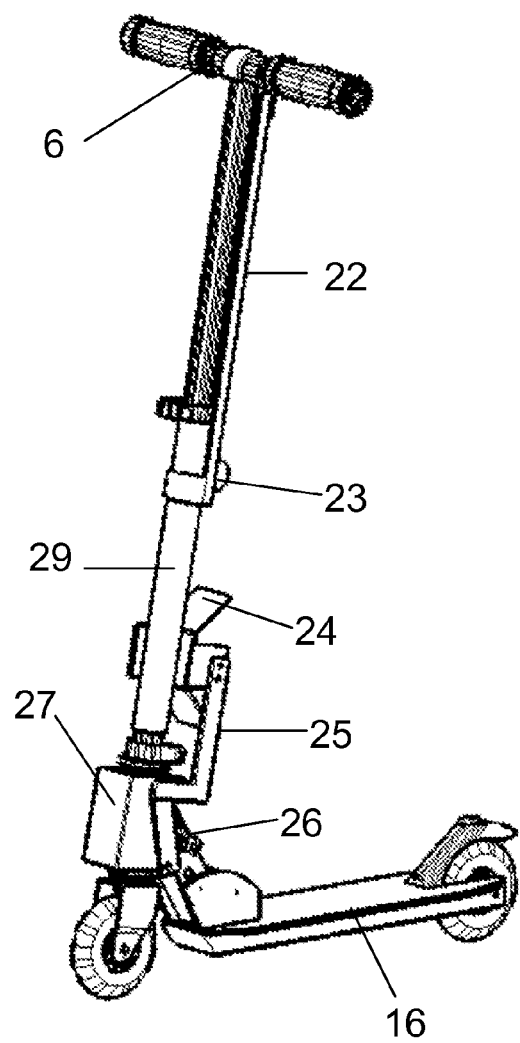
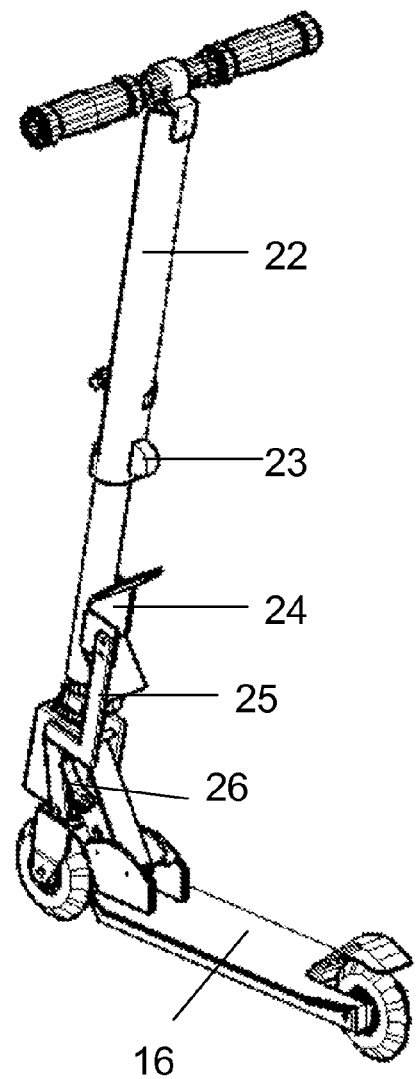

AUTOMATIC SCOOTER UNLOCKING MECHANISM

CROSS REFERENCE TO RELATED APPLICATIONS

This application claims benefit under 35 U.S.C. §119 of provisional patent application No. 61/457,173 filed on Jan. 21, 2011 and entitled "Automatic Scooter Unlocking Mechanism," the entire contents of which are hereby incorporated by reference.

BACKGROUND OF THE INVENTION

Folding kick scooters generally have two modes of use: a riding mode, where a user can ride the scooter in a traditional manner, and a carrying mode where the scooter is folded up and carried by hand. This is often referred to as a collapsible scooter. The scooter collapses, or folds, when the footboard is allowed to rotate relative to an upright handlebar assembly through a pivoting joint. The scooter is in riding mode when the footboard is in a position extending away from the handlebar assembly and in carrying mode when in a position adjacent, and usually parallel to, the handlebar assembly.

These scooters typically employ a latch to lock the position of the footboard in either position. The latch is usually located near the pivoting joint and is spring loaded, biased to remain in the locked position, and connected to some sort of handle, or turnkey, that a user can grasp and manipulate to overcome the bias and unlock the latch. Typically, the turnkey is linked to the latch so that rotation of the turnkey changes the latch from a locked state to an unlocked state. Only when the restraining bolt is in the unlocked state can the footboard be rotated relative to the handlebar assembly.

In addition, these folding kick scooters also employ a telescoping handlebar to minimize the overall scooter volume when in the carrying mode. To convert between carrying and riding modes, a user is required to raise or lower the telescoping handlebar and manually rotate the turnkey, in two independent operations. Raising or lowering the handlebar requires the user to grasp it with their hand and either pull up or push down. Rotating the turnkey requires the user to grip it with their hand and rotate against the force of a spring. In certain circumstances, these two operations can be quite cumbersome.

For example if it is cold outside, a user may not easily be able to grip the turnkey for rotation. Also, if the user applies a force to the handlebar assembly or footboard while attempting to manipulate the latch, this can cause the latch to resist movement out of its locked state due to frictional forces. This makes the requisite rotation of the turnkey very difficult and impossible for these users. Additionally, the location of the latch near the pivoting joint requires the user to either bend down to the ground or lift the scooter up to access the turnkey. This can be difficult to do in crowded situations or if the user has other personal belongings they must carry simultaneously.

The object of this invention is to remove all of these difficulties and to combine the two user operations, raising/lowering the handlebar and rotating the turnkey to unlock the latch, into one operation. This saves a great amount of time and effort for the user. Furthermore, when this invention is combined with an automatic folding mechanism, as described in commonly owned U.S. Pat. Nos. 7,431,311 and 7,731,204 (herein after incorporated by reference), a remarkably convenient and useful tool for scooter riders is created.

SUMMARY OF THE INVENTION

This invention is related to an improvement in the structure of a folding kick scooter.

It is the primary object of the present invention to provide a folding kick scooter that includes an upright handlebar assembly that is slidable in a telescoping fashion, a footboard unit, a pivoting joint connecting the footboard to the handlebar assembly, a latch in connection with the pivoting joint, a handle in connection with the latch where manipulation of the handle causes the latch to move from a locked position to an unlocked position, an elongate member attached at its proximal end to the handle and extends towards the handlebar assembly, a curved or angled member attached to the distal end of the elongate member, and a cam member attached to the slidable portion of the handlebar assembly that extends towards the footboard.

It is another object of the present invention to provide a folding kick scooter wherein the handlebar assembly can slidably travel between upper-most and lower-most positions and the cam member is positioned to contact the curved member when the handlebar assembly is between the upper-most and lower-most positions.

It is still another object of the present invention to provide a folding kick scooter wherein the cam member contacts the curved member during handlebar assembly travel, deflecting the curved member and causing a corresponding rotation of the elongate member and latch handle, which then causes the latch to move from a locked state to an unlocked state.

It is a further object of the present invention to provide a folding kick scooter which is simple in construction and allows for quick and easy conversion between carrying and riding modes. It is yet a further object of the present invention to provide an automatic scooter unlocking system that can be removably installed on to a pre-existing kick scooter without substantial modification thereto.

BRIEF DESCRIPTION OF THE DRAWINGS

FIGS. 1A-2B show the prior art.
FIGS. 3A and 3B show an isometric view of the preferred embodiment.
FIG. 4A shows a close-up view of the latch mechanism of the preferred embodiment
FIG. 4B shows a close-up view sled and sled arm of the preferred embodiment.
FIGS. 5A and 5B show components of the preferred embodiment removed from the scooter.
FIGS. 6A-12B show the step-by-step operation of the invention.
FIGS. 13-15 show the step-by-step reverse operation of the invention.
FIGS. 16A and 16B show an isometric view of an alternative embodiment.

DETAILED DESCRIPTION

Figure 1A:
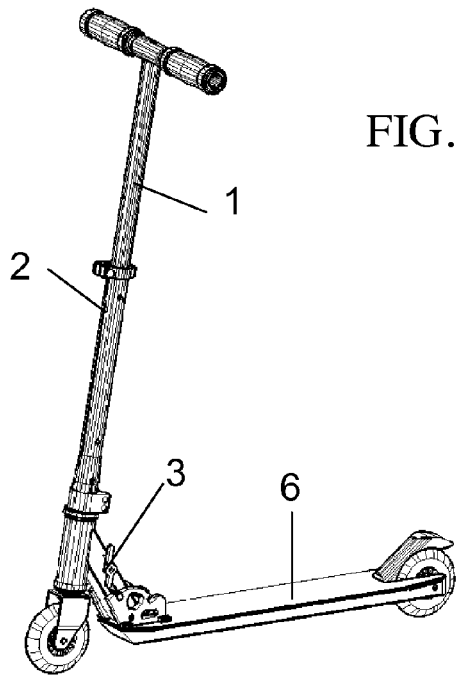
Figure 1B:
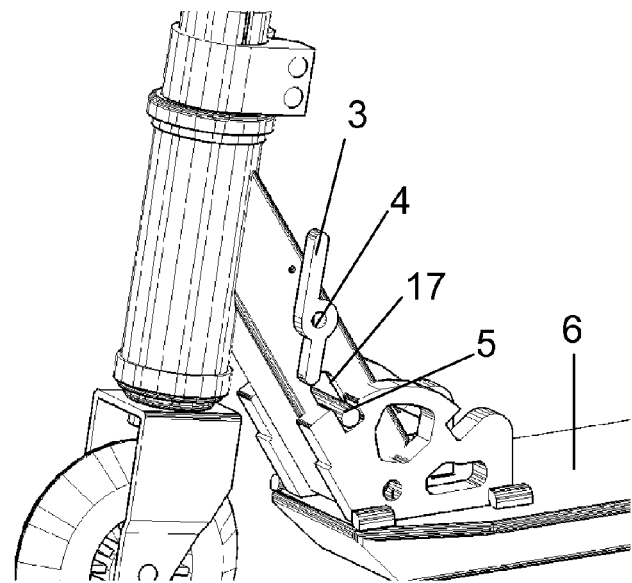
Figures 2A, 2B:
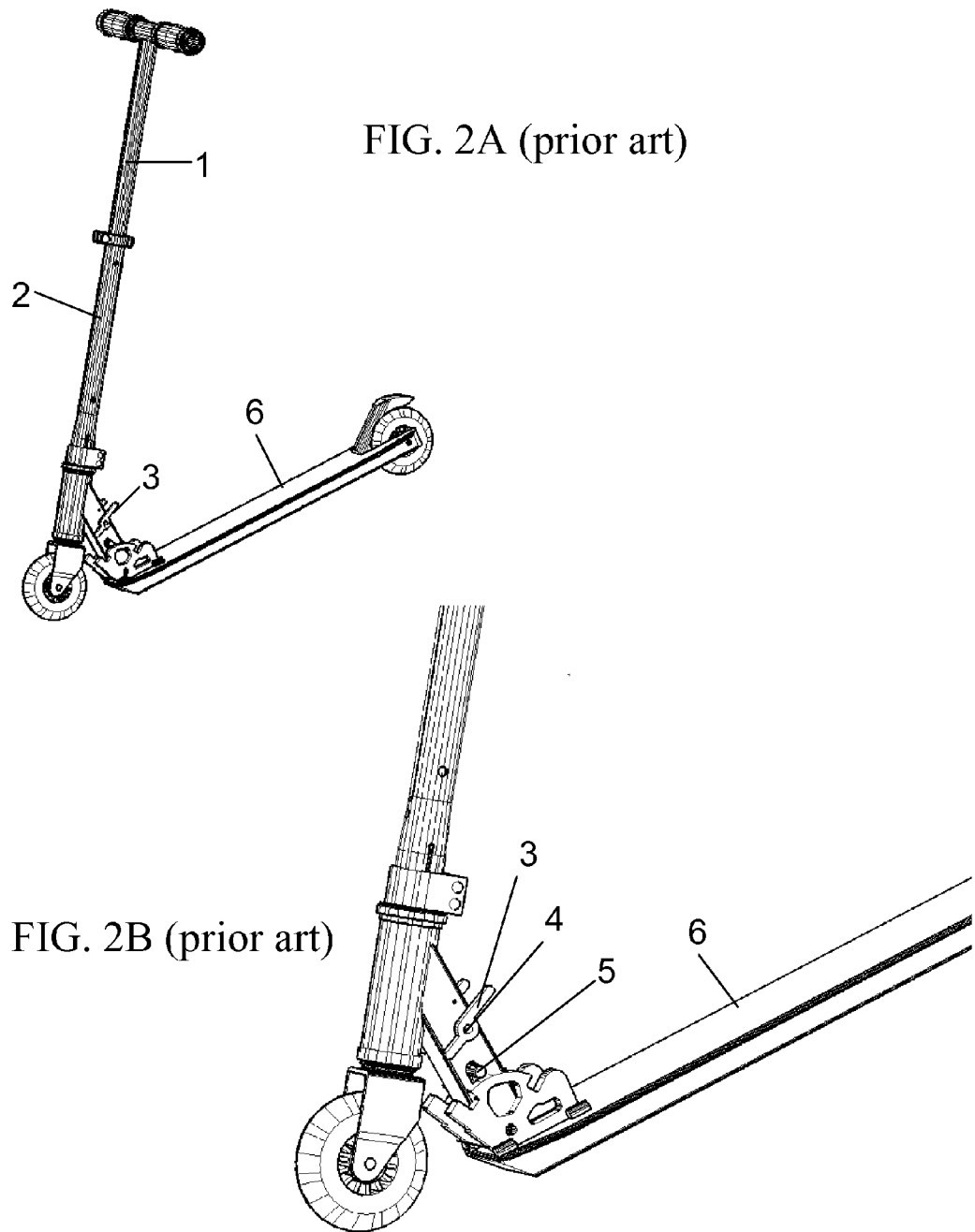

Referring to FIGS. 1A-2B, the prior art folding kick scooter designs generally comprise at least one front wheel, one rear wheel, handlebar 1, column 2, turnkey 3, a turnkey bolt 4, a restraining bolt 5, a footboard 6, and a slot 17. There, a restraining bolt 5 moves between a locked and an unlocked state. In FIGS. 1A and 1B the restraining bolt is in a locked state, and in FIGS. 2A and 2B the restraining bolt is in an unlocked state. A turnkey 3 is attached to the restraining bolt 5 through a turnkey bolt 4 and a mechanism (not shown) internal to the scooter which converts rotation of the turnkey 3 and turnkey bolt 4 to a translational movement of the restraining bolt 5. The restraining bolt 5 is allowed to translate within a slot 17. The turnkey 3 and restraining bolt 5 are usually spring biased to remain in a locked state. Hence, the user must apply a force to the turnkey 3, overcoming this spring force, to unlock the scooter. When unlocked, the footboard 6 and a column 2 can be rotated with respect to each other. When locked, rotation between the footboard 6 and the column 2 is prevented. The handlebar 1 of the prior art is telescoping, and is allowed to slide within column 2 during conversion between riding and carrying modes of use. Currently the user is required to independently move the handlebar 1 and rotate the turnkey 3 to switch the scooter between modes, which can be difficult in certain circumstances as described above. The presently proposed invention transforms these two operations into one, greatly saving the user time and effort.

The presently proposed invention causes the turnkey 3 to rotate at a certain point during the raising and lowering of the handlebar 1, without the previously required step of gripping and manually rotating the turnkey 3. The preferred arrangement of the invention can be seen in FIGS. 3A and 3B. The handlebar 6 slides within a column 7 in a telescopic fashion. Column 7 has a slot 8 that runs along a longitudinal direction with a length approximately equal to the distance the handlebar 6 travels as it slides, or telescopes, within the column 7. The slot 8 is found on at least one side of column 7, but is preferably on two opposite sides of column 7. A crossbolt 19 is attached near the bottom end of the handlebar 6 and protrudes out through the slot 8 in both directions. Optionally, but preferably, a collar 20 is located around the column 7 and crossbolt 19 to provide stability. A cam 9 is attached to the end of crossbolt 19, oriented in a direction towards the footboard 16. Cam 9 generally has a rounded shape so as to contact and slide against sled 10 when the handlebar 6 is raised and lowered. However, cam 9 may optionally have a triangular, pyramidal, or toroidal shape, among others. FIGS. 5A and 5B further show the slot 8 in column 7, crossbolt 19, collar 20, and cam 9.

Sled 10 is attached to a distal end of sled arm 11. Sled 10 preferably has two inclined surfaces, one at the top and one at the bottom, and at least one side surface to attach to a distal end of sled arm 11, as shown in FIG. 4B. However, sled 10 may optionally have a triangular, pyramidal, or rounded shape, among others, so long as it is situated to contact cam 9 when handlebar 6 is raised or lowered, and when contacted, cause deflection. In the preferred embodiment, there are two sled arms 11, each attaching to a respective side surface of sled 10, however it is not required for the present invention, and there may only be one side surface to sled 10 with a single sled arm 11 attached thereto.

The sled arm 11 is attached at its proximal end to a turnkey 12, which may resemble the turnkey 3 in the prior art or may be shaped differently. This attachment can permanent or removable, and can be effected through the use of adhesives or mechanical fasteners, as are known in the art. Optionally, turnkey 12 may be integral to the proximal end of sled arm 11, as in a one-piece construction. Preferably, sled arm 11 is of straight construction but may optionally be curved or take other shapes for aesthetic reasons or to improve the mechanical advantages during the transmission of forces from sled 10 to turnkey bolt 13.

The turnkey 12 is permanently attached, or in an alternative embodiment removably attached, to a turnkey bolt 13. This is may be effected through a slot and key engagement as is common in the art. In the preferred embodiment, there are two turnkeys 12 attached to opposite ends of turnkey bolt 13, as is seen in FIG. 4A. In alternative embodiments, there may be only one turnkey 12 attached to a single end of turnkey bolt 13. The turnkey bolt 13 is attached to restraining bolt 14 through a mechanism (not shown) that converts rotation of turnkey bolt 13 into a translation of restraining bolt 14. This mechanism (not shown) is located inside the frame of the scooter as is common in the prior art. Restraining bolt 14 is allowed to slide within a slot 18 of the scooter frame, and is spring-biased (not shown) to remain in the lowest position of slot 18. In the lowest position, restraining bolt 14 engages a grooved piece 21. This can be seen in FIGS. 4A and 6B. Grooved piece 21 is fixedly attached to footboard 16, as is common in the prior art. When restraining bolt 14 is in the lowest position within slot 18, it engages grooved piece 21, and the footboard is prevented from rotating with respect to the column 7 and handlebar 6. The scooter is locked in this position.

FIGS. 6A-12B show the operation of the inventive mechanism when the user wishes to convert the scooter from riding mode to carrying mode. In FIGS. 6A and 6B the scooter is in a locked state in riding mode. The footboard 16 is prevented from rotating, or folding, with respect to the column 7 due to the engagement of restraining bolt 14 with grooved piece 21. Handlebar 6 is located in its uppermost position, and the scooter is suitable for riding. Cam 9 is located above sled 10. Sled 10 is proximate to column 7, attached to the turnkey bolt 13 through sled arm 11 and turnkey 12, and is biased to remain in that position due to a second spring force applied to turnkey 12 (not shown) and to the first spring force applied to restraining bolt 14 internal to the scooter frame (not shown).

Figure 7B:
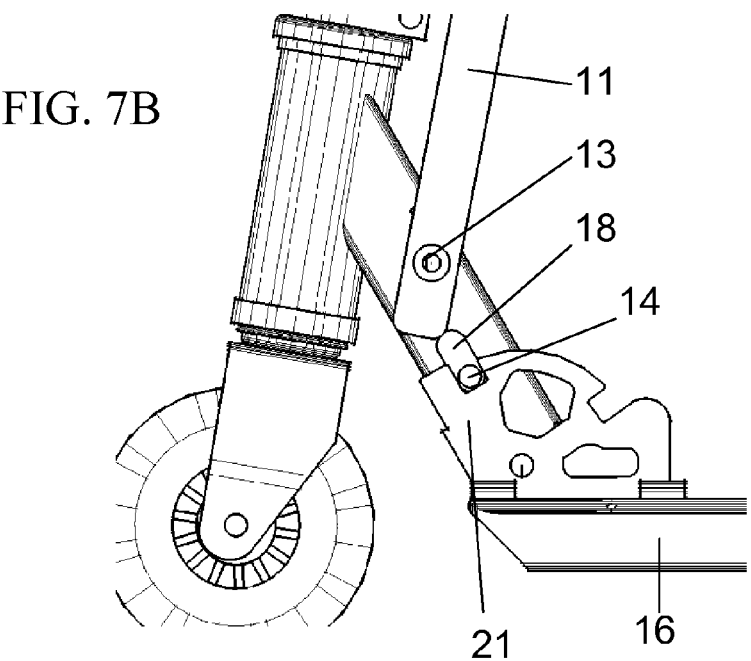
Figure 7A:
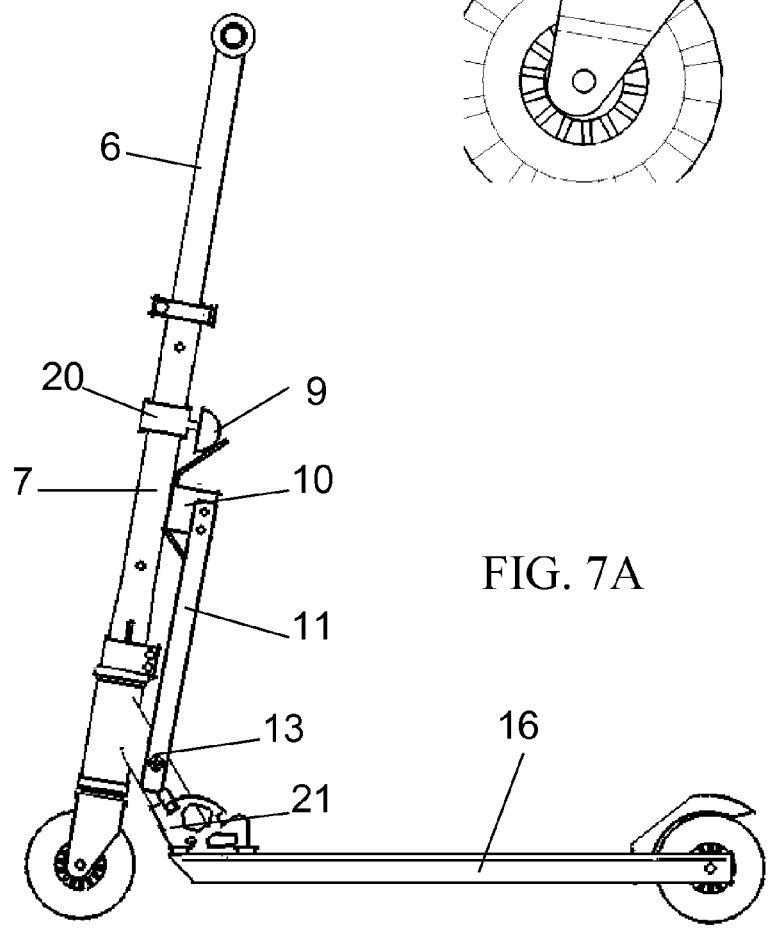

In FIG. 7A the handlebar has traveled to a lower position than that in FIG. 6A. As a result, cam 9 contacts a top inclined surface of sled 10, but has not forcibly deflected sled 10 away from column 7. Restraining bolt 14 remains in the lowest position within slot 18 and engages grooved piece 21, as shown in FIG. 7B. The scooter remains in a locked state at this point in the operation of the inventive mechanism.

Figure 8B:
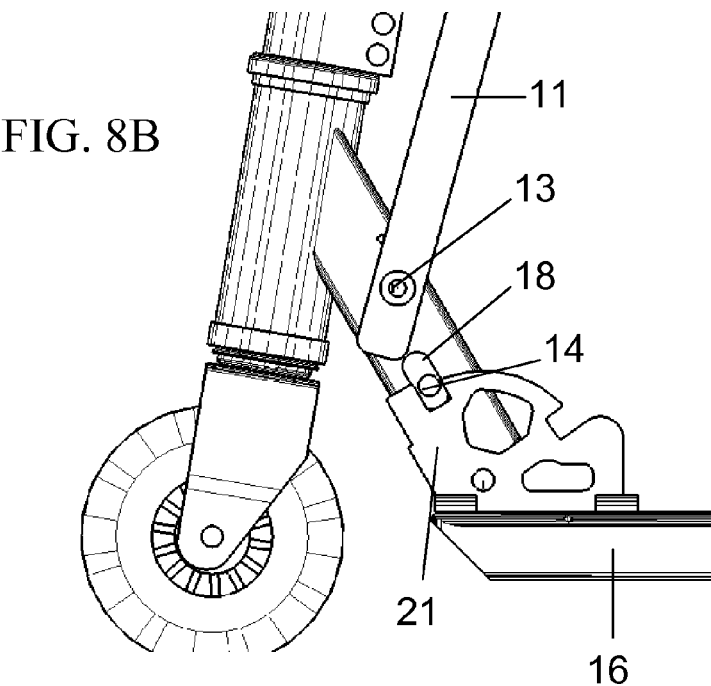
Figure 8A:
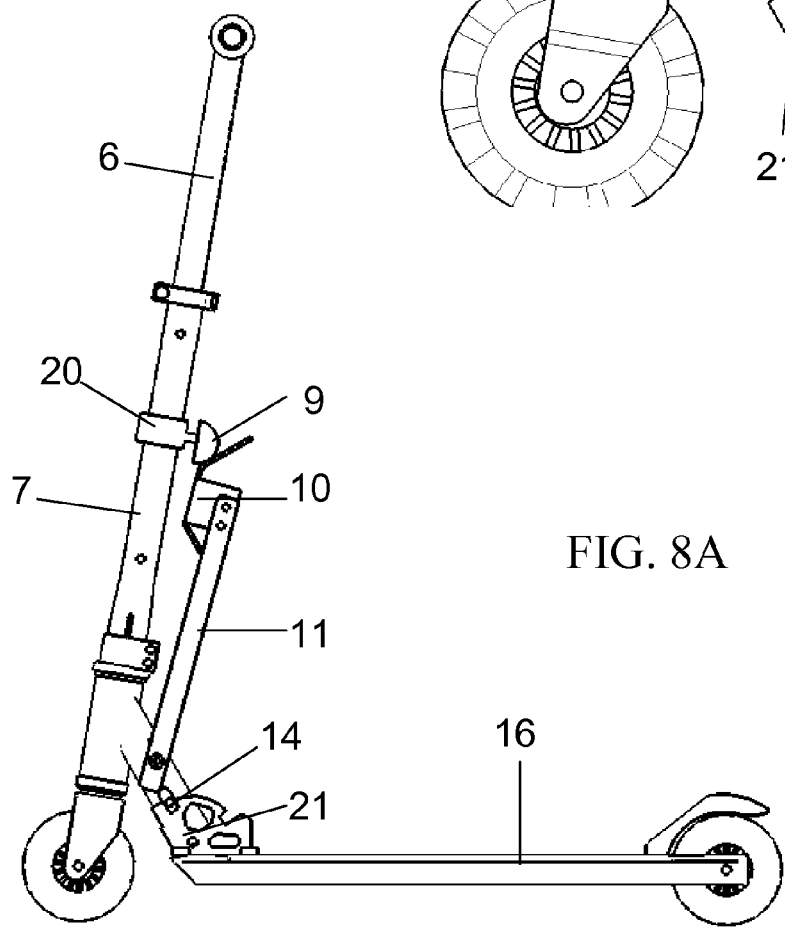

In FIG. 8A the handlebar 6 has been further lowered and cam 9 forcibly contacts the top inclined surface of sled 10. This causes sled 10 to slightly deflect away from column 7. This deflection causes a corresponding slight rotation of sled arm 11 and turnkey 12 away from column 7, further causing slight rotation of turnkey bolt 13. The rotation of turnkey bolt 13 causes a slight translation of restraining bolt 14 within slot 18 through a mechanism that is internal to the scooter frame (not shown). Restraining bolt 14 remains in the lower half of slot 18 and continues to engage grooved piece 21, as shown in FIG. 8B. The scooter is still locked and prevented from folding at this point in the operation of the inventive mechanism.

Figure 9B:
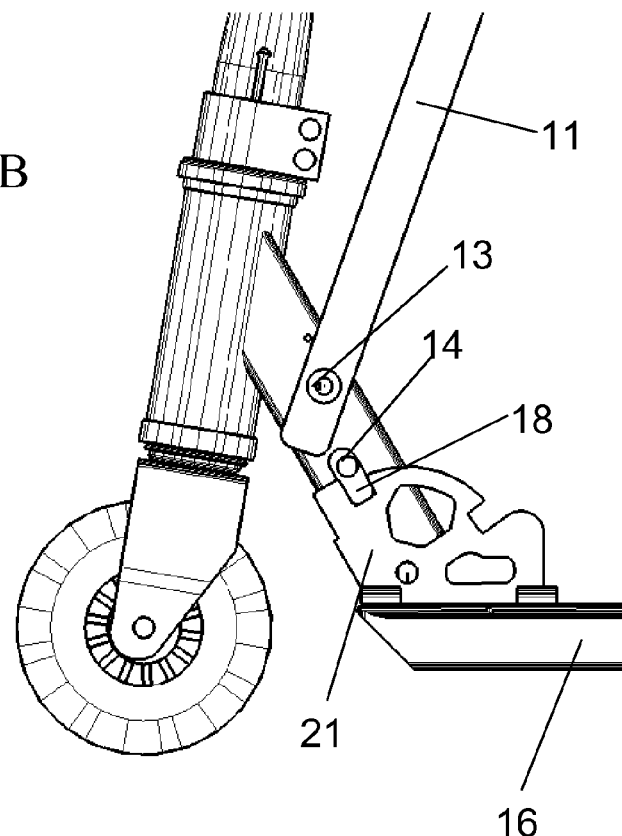
Figure 9A:
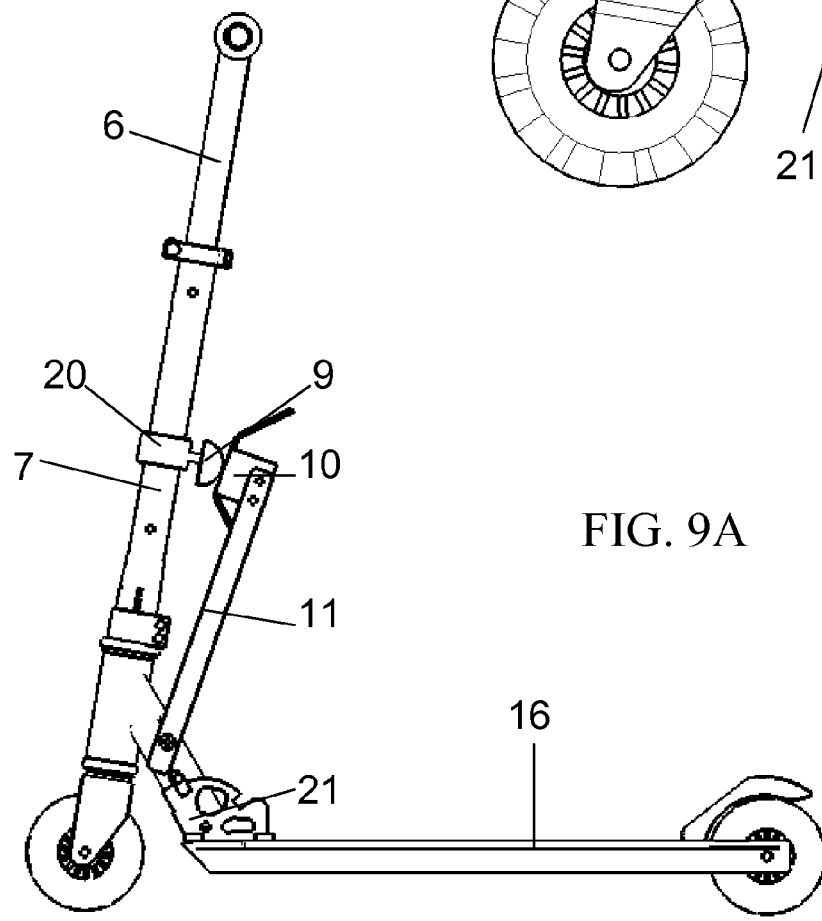

However, in FIGS. 9A and 9B the user has further lowered handlebar 6 and cam 9 now deflects sled 10 further away from column 7. This causes further rotation of turnkey bolt 13 and a corresponding further translation of restraining bolt 14 to the uppermost position within slot 18. Here, restraining bolt 14 no longer engages grooved piece 21, as shown in FIG. 9B, and does not prevent the footboard 16 from rotating, or folding, with respect to the column 7. The scooter is in an unlocked state at this point in the operation of the inventive mechanism.

Rotation of the footboard 16 with respect to the column 7 can be accomplished at this point, either manually, by the user by lifting the footboard with his or her hand, or automatically with an automatic folding mechanism as described in U.S. Pat. Nos. 7,431,311 and 7,731,204 (herein incorporated by reference).

Figure 10B:
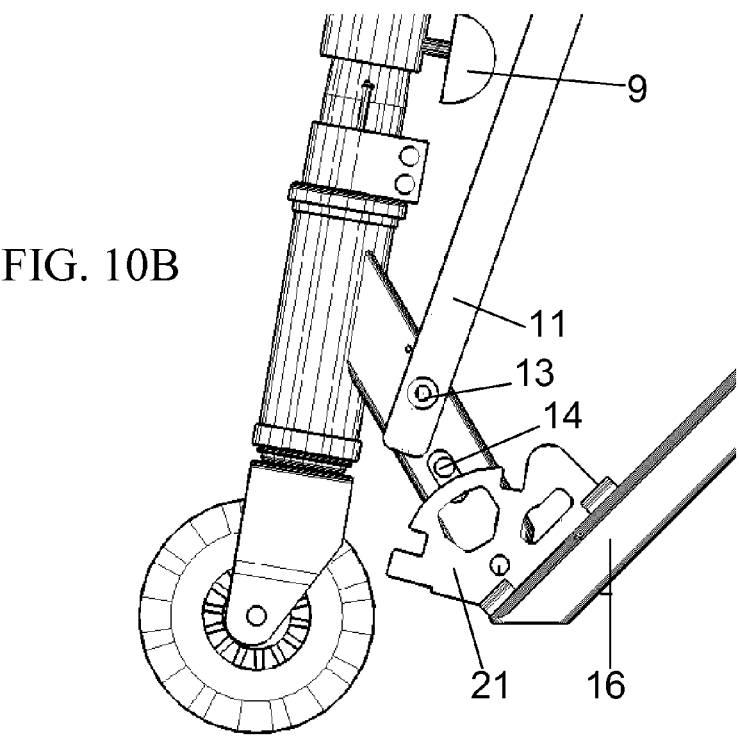
Figure 10A:
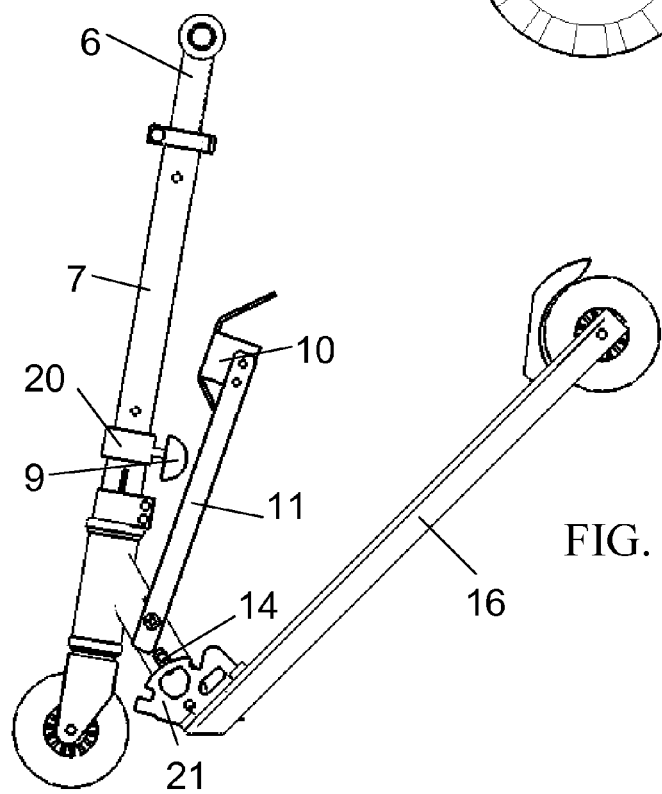

In FIG. 10A the footboard 16 has been rotated approximately half-way to its final folded up position. Handlebar 6 is pushed to its lowest position by the user. Cam 9, which is attached to and moves with handlebar 6, has moved past sled 10 and ceases contact with sled 10. Due to the rotation of the footboard 16, grooved piece 21 now contacts restraining bolt 14 in a way that keeps restraining bolt 14 from reaching its lowermost position within slot 18, as shown in FIG. 10B, and keeps the scooter in an unlocked state.

Figure 11B:
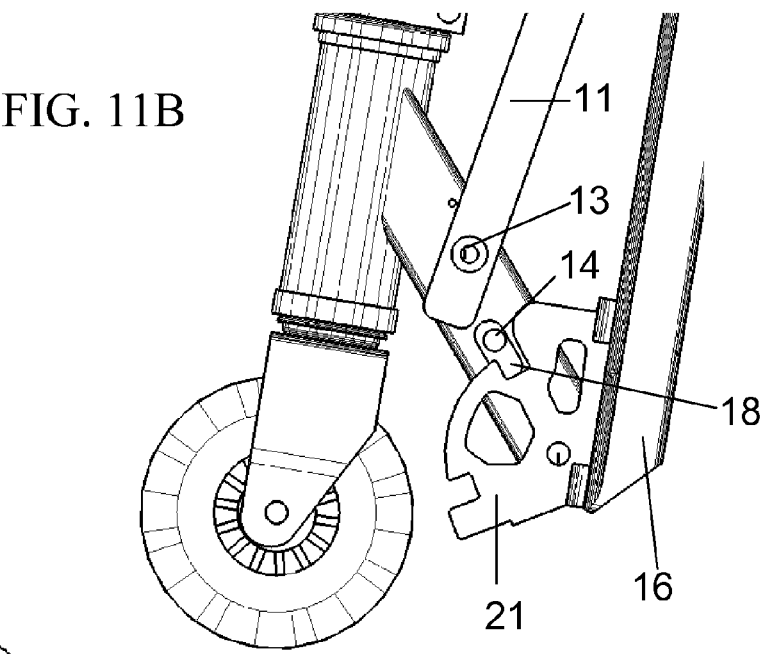
Figure 11A:
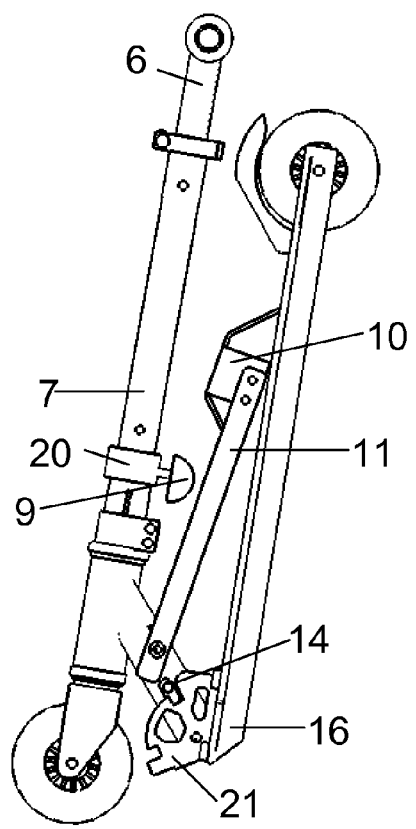

In FIG. 11A the footboard 16 has been rotated further but has not reached its final position. Here, restraining bolt 14 continues to contact grooved piece 21 in a way that prevents restraining bolt 14 from reaching its lowermost position within slot 18. Footboard 16 is still free to rotate and the scooter remains in an unlocked state.

Figure 12A:
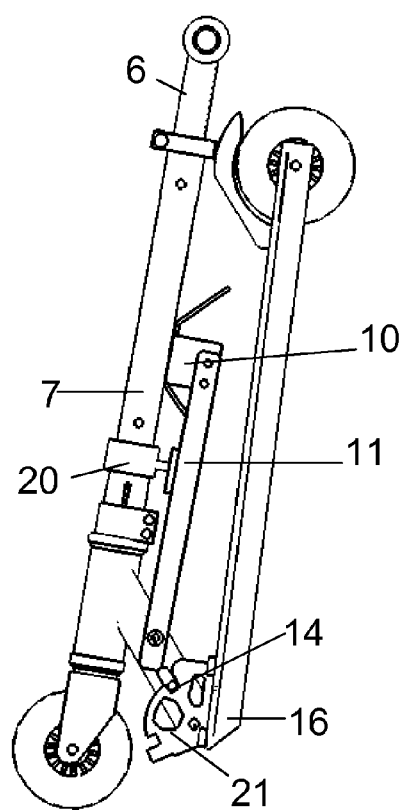
Figure 12B:
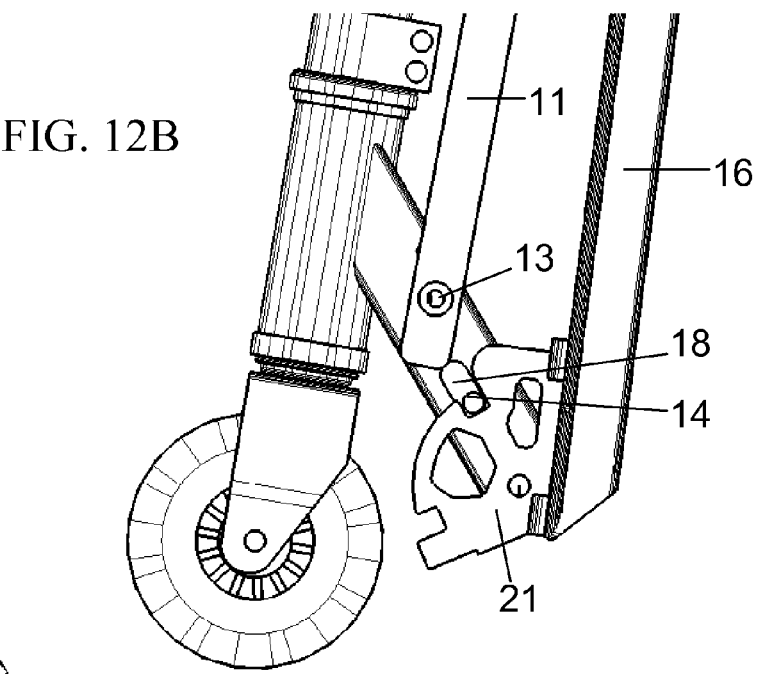

However, in FIG. 12A the footboard 16 has fully rotated to its final position and grooved piece 21 no longer prevents restraining bolt 14 from returning to its lowest position within slot 18 due to action of the spring bias internal to the scooter frame (not shown). Cam 9 is fully below sled 10, between sled arms 11, and sled 10 is allowed to rotate back to a position proximate to column 7 due to the spring bias (not shown) acting on turnkey bolt 13 and sled arm 11. In this position restraining bolt 14 engages grooved piece 21 and the footboard 16 is prevented from rotating with respect to column 7. The scooter has returned to a locked state, this time in carrying mode.

FIGS. 13A-15B show the reverse operation of the inventive locking mechanism shown in FIGS. 6A-12B. Cam 9 is raised from its lowest position when handlebar 6 is raised and eventually contacts the bottom inclined surface of sled 10. Similar to the operation of FIGS. 6A-12B, further raising of handlebar 6 causes cam 9 to deflect sled 10 away from column 7, which rotates turnkey bolt 13 and translates restraining bolt 14, disengaging it from grooved piece 21. When disengaged, footboard 16 is allowed to freely rotate with respect to column 7, which can be performed manually by the user or automatically as in U.S. Pat. Nos. 7,431,311 and 7,731,204. The reverse operation of FIGS. 13A-15B occurs when the user wishes to convert the scooter from carrying mode to riding mode.

In an alternative embodiment, as shown in FIGS. 16-20E, the present invention may comprise a system that is capable of being installed on to and removed from a pre-existing scooter in an aftermarket fashion. This alternative embodiment is especially useful because it provides the inventive functionality without the need to modify structure of the underlying scooter, and can therefore be attached to scooters already in the marketplace.

Figure 18:
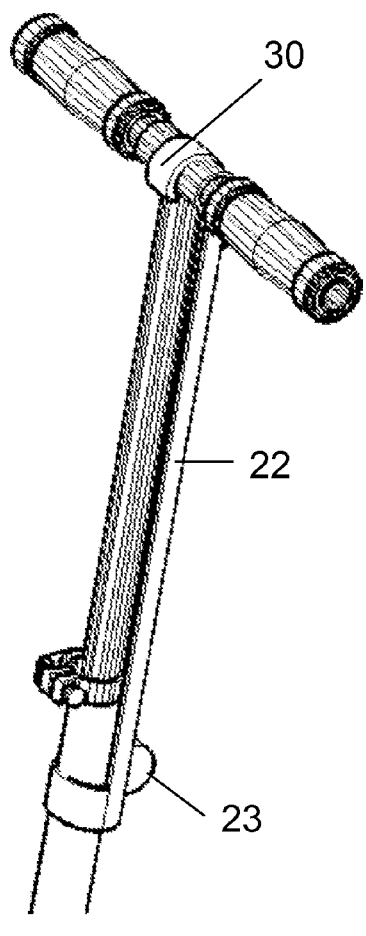
FIG. 18 shows a close-up view of the handlebar of the alternative embodiment.
Figure 19A:
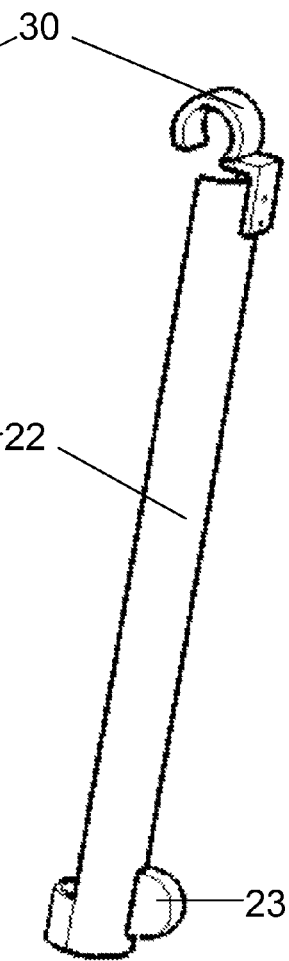
FIGS. 19A and 19B show the camshaft of the alternative embodiment removed from the scooter.
Figure 19B:
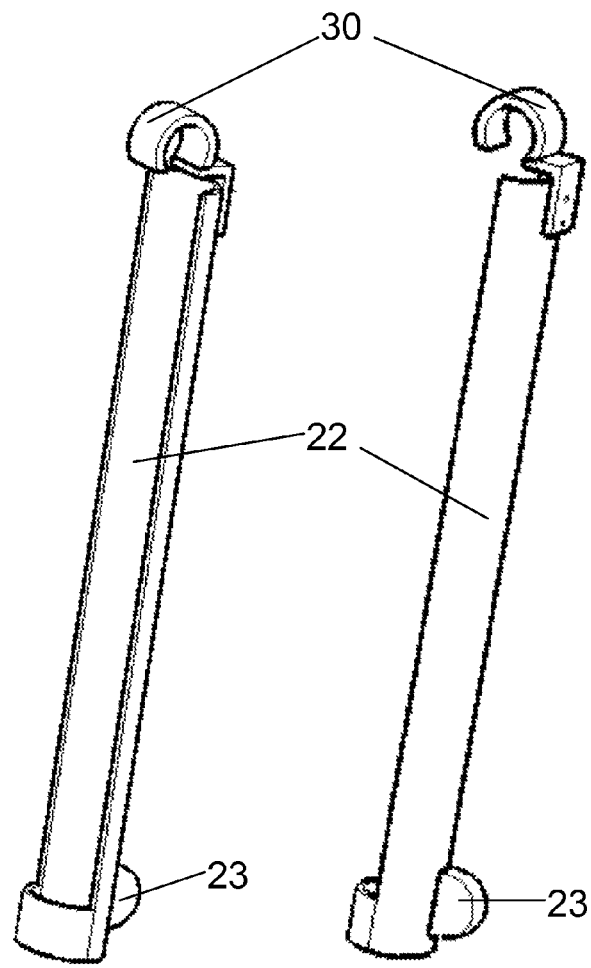
Figures 20A, 20B, 20C, 20D:
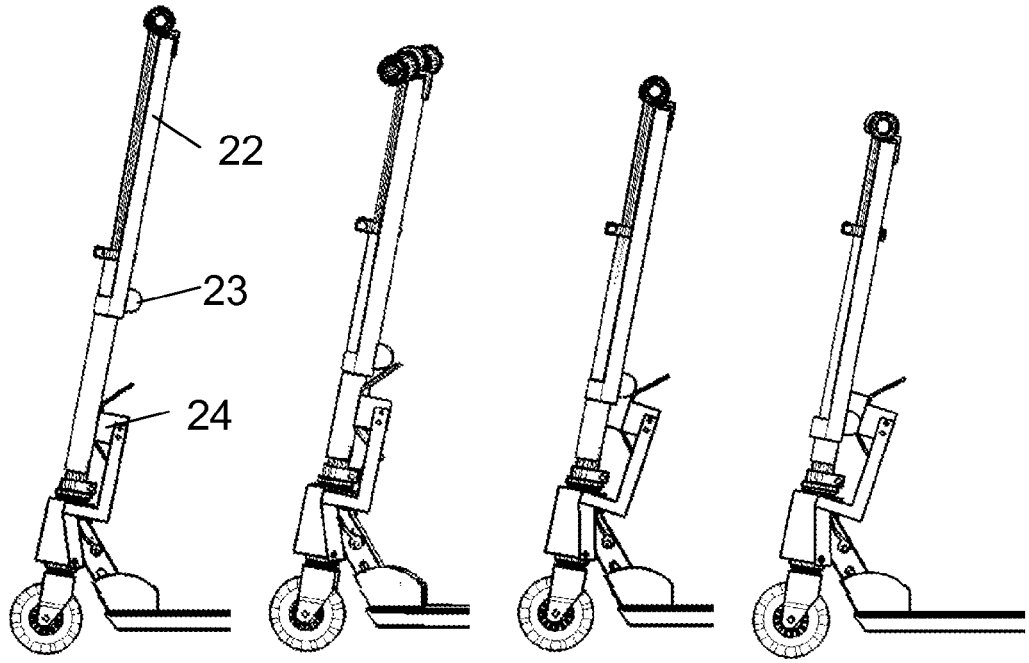
FIGS. 20A-20E show the step-by-step operation of the alternative embodiment.
Figure 20E:
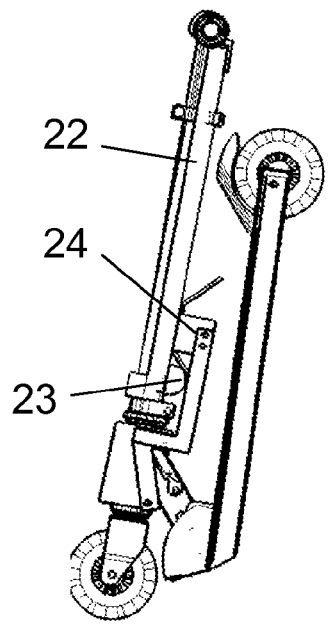

This alternative embodiment can be generally seen in FIGS. 16A and 16B. A camshaft 22 is located adjacent to extends along a portion of handlebar 6 and column 29. A distal end of camshaft 22 is fixedly, but removably, attached through a clip 30 or other means to the top of handlebar 6, as seen in FIGS. 18-19B. A proximal end of camshaft 22 is attached to column 29 in a manner allowing for camshaft 22 to slide along column 29 when handlebar 6 is raised or lowered. This can also be accomplished through the use of a clip or other attachment means. Additionally, a cam 23 is attached to camshaft 22 at the proximal end, and extends in a direction away from column 29 in a manner similar to the preferred embodiment.

Figure 17A:
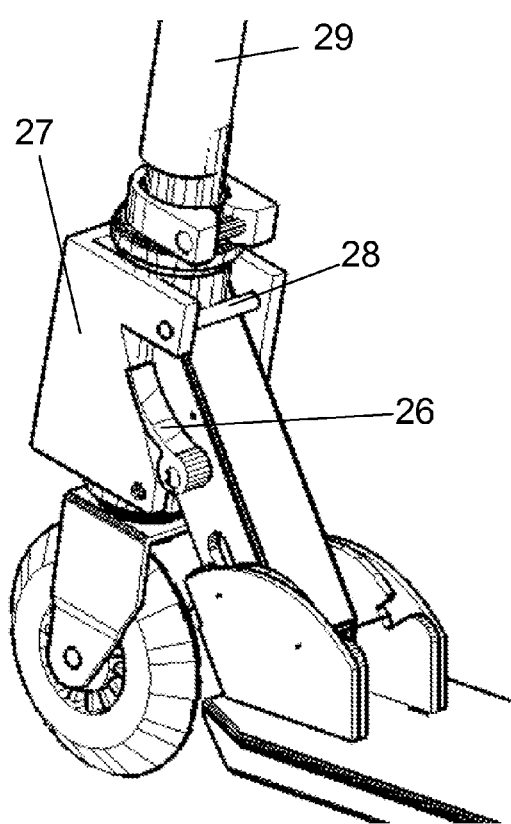
FIGS. 17A and 17B show close-up views of the sled and sled arm of the alternative embodiment.

Further in the alternative embodiment, there is a sled 24 attached to the distal end of at least one sled arm 25. In this embodiment, the proximal end of the sled arm 25 is not fixedly attached to the turnkey and turnkey bolt, but instead pivotally attached to a portion of a bracket 27. Bracket 27 is permanently, or removably attached to the scooter in a location above the front wheel and can take many shapes, but a three-walled box is preferred. The bracket 27 can be seen in further detail in FIGS. 17A and 17B. In FIG. 17A, sled arm 25 and sled 24 have been removed for clarity and bracket 27 can be seen. Bracket 27 is preferably comprised of one front wall and two side walls, and is installed on to a location above a front wheel of the scooter. This is accomplished by fitting bracket 27 onto one side of a portion of scooter, and then placing at least one removable connecting member 28 across the side walls of bracket 27 on the other side of the portion of the scooter. This secures the bracket 27 to the scooter in a rigid fashion while allowing for unencumbered rotation of the front wheel for steering. Sled arm 25 can be pivotally attached anywhere along the side wall of bracket 27 that is on the same side as turnkey 26, but the location 31 is preferable for mechanical advantage reasons, as seen in FIG. 17B.

Figure 17B:
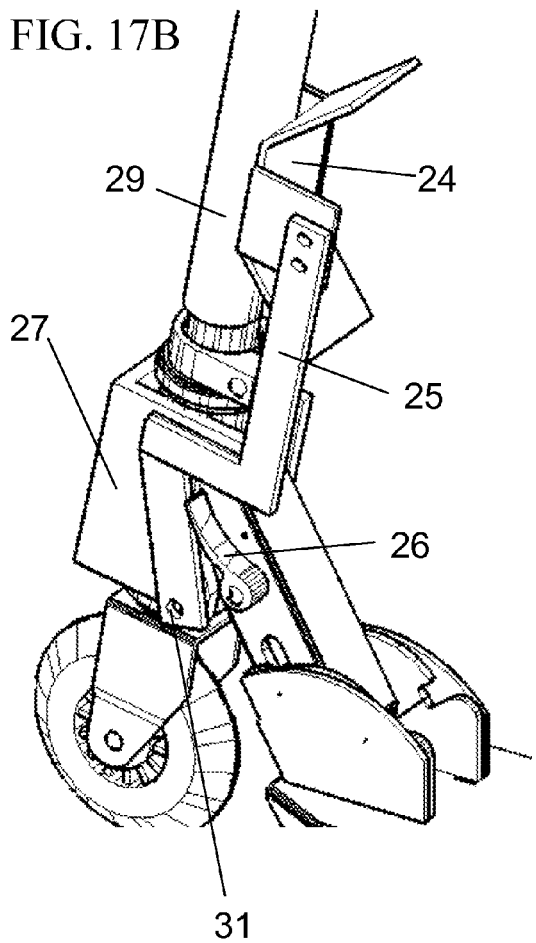

As can be further seen in FIG. 17B, sled arm 25 is shaped in such a way to position sled 24 so that it will contact cam 23 during raising and lowering of handlebar 6, and to make contact with turnkey 26. With such a shape, sled arm 25 contacts the turnkey 26 on a side of turnkey 26 that is opposite from the direction of movement of turnkey 26 during unlocking of the scooter footboard. In this way, when sled 24 is deflected due to contact with cam 23, sled arm 25 pushes against turnkey 26 and rotates it, against an internal resistive spring force (not shown), in the proper direction to unlock the scooter and allow for folding, as in the preferred embodiment.

Consequently, the system of the alternative embodiment functions in a similar way to that of the preferred embodiment, allowing for an automatic unlocking of the scooter footboard when the handlebar is raised or lowered. This can be seen in FIGS. 20A-20E.

The components of both the preferred and alternative embodiments may be constructed of any material that has the strength and rigidity to perform the relevant function of that component. However metals and hard plastics, specifically ABS plastic, are preferred. Accordingly, the components of both the preferred and alternative embodiments, for example the cam, sled arm, and bracket components, may take any shape so long as the relevant functionality is maintained.

The present invention, in either the preferred or alternative embodiment, accordingly functions to combine two common user operations involved in, the folding of a kick scooter into one. It improves the ease and speed at which a user can convert their kick scooter between riding and carrying modes. It can be implemented during the manufacture of folding kick scooters or can be installed on to any preexisting kick scooter that uses a telescoping handle and a rotating turnkey latch release mechanism. Furthermore, the benefits of the present invention are magnified when implemented on a kick scooter with an automatic folding mechanism, as described in U.S. Pat. Nos. 7,431,311 and 7,731,204.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A wheeled vehicle with at least one front wheel and one rear wheel, a collapsible upright handle assembly, a supporting unit pivotable between a first position and a second position, and a latch mechanism for securing the supporting unit in either the first position or second position, comprising:
   a handle secured to the latch mechanism, whereby rotation of said handle changes the latch mechanism from a latched state to an unlatched state;
   a longitudinal member attached at a proximal end to said handle, wherein said longitudinal member extends in a direction generally parallel to the upright handle assembly;
   an angled member attached to the distal end of said longitudinal member;
   whereby said collapsible upright handle assembly is comprised of first and second column members, wherein said first column member is slidable within said second column member;
   a longitudinal aperture located on a wall of said second column member;
   a rigid protuberance in connection with said first column member, whereby said protuberance extends away from said first column member and through said aperture on said second column member;
   whereby said protuberance is configured to contact said angled member as said first column member is slid within said second column member, and said contact causes movement in said angled member so as to rotate said handle.

2. The wheeled vehicle according to claim 1, wherein the angled member is comprised of top and bottom inclined surfaces, wherein said top inclined surface is positioned to face an upper portion of said handle assembly and said bottom inclined surface is positioned to face a lower portion of said handle assembly.

3. The wheeled vehicle according to claim 2, wherein the angled member is further comprised of a middle surface, wherein said middle surface is positioned between the top and bottom inclined surfaces and is positioned to face said handle assembly.

4. The wheeled vehicle according to claim 1, wherein the angled member is comprised of a semi-spherical shape positioned to face said handle assembly.

5. The wheeled vehicle according to claim 1, wherein said longitudinal member is straight.

6. The wheeled vehicle according to claim 1, wherein said longitudinal member is curved.

7. The wheeled vehicle according to claim 1, wherein said longitudinal member is a first longitudinal member and wherein a second longitudinal member is attached at a distal end to said angled member on a side opposite from the attachment of said angled member to said first longitudinal member.

8. The wheeled vehicle according to claim 7, wherein said first and second longitudinal members are straight.

9. The wheeled vehicle according to claim 7, wherein said first and second longitudinal members are curved.

10. The wheeled vehicle according to claim 1, wherein the protuberance is comprised of top and bottom angled surfaces, wherein said top angled surface is positioned to face upwards and away from said handle assembly, and said bottom angled surface is positioned to face downwards and away from said handle assembly.

11. The wheeled vehicle according to claim 1, wherein the protuberance is further comprised of a middle surface, wherein said middle surface is positioned between the top and bottom angled surfaces and is positioned to face away from said handle assembly.

12. The wheeled vehicle according to claim 1, wherein the protuberance is comprised of a semi-spherical shape positioned to face away from said handle assembly.

13. The wheeled vehicle according to claim 1, wherein said first column member is slidable between expanded and collapsed positions within said second column member, and said protuberance is further configured to not contact said angled member when said first column is in either the expanded or collapsed positions.

14. A wheeled vehicle with at least one front wheel and one rear wheel, a collapsible upright handle assembly, a supporting unit pivotable between a first position and a second position, and a latch mechanism for securing the supporting unit in either the first position or second position, comprising:
   a handle secured to the latch mechanism, whereby rotation of said handle changes the latch mechanism from a latched state to an unlatched state;
   a longitudinal member attached at a proximal end to said handle, wherein said longitudinal member extends in a direction generally parallel to the upright handle assembly;
   an angled member attached to the distal end of said longitudinal member;
   wherein the angled member is comprised of top and bottom inclined surfaces, wherein said top inclined surface is positioned to face an upper portion of said handle assembly and said bottom inclined surface is positioned to face a lower portion of said handle assembly;
   whereby said collapsible upright handle assembly is comprised of first and second column members, wherein said first column member is slidable within said second column member between expanded and collapsed positions;
   a longitudinal aperture located on a wall of said second column member;
   a rigid protuberance in connection with said first column member, whereby said protuberance extends away from said first column member and through said aperture on said second column member;
   wherein the protuberance is comprised a semi-spherical shape positioned to face away from said handle assembly;
   whereby said protuberance is configured to contact said angled member as said first column member is slid within said second column member, and said contact causes movement in said angled member so as to rotate said handle;
   whereby said protuberance is further configured to not contact said angled member when said first column member is in either the expanded or collapsed positions.

* * * * *